United States Patent
Ikeo (10) Patent No.: US 10,088,739 B2
(45) Date of Patent: Oct. 2, 2018

(54) COOLING DEVICE, OPTICAL MODULE PROVIDED WITH THE SAME, AND PROJECTING DEVICE

(71) Applicant: Panasonic Intellectual Property Management Co., Ltd., Osaka (JP)

(72) Inventor: Kenji Ikeo, Osaka (JP)

(73) Assignee: PANASONIC INTELLECTUAL PROPERTY MANAGEMENT CO., LTD., Osaka (JP)

( * ) Notice: Subject to any disclaimer, the term of this patent is extended or adjusted under 35 U.S.C. 154(b) by 0 days.

(21) Appl. No.: 15/454,188

(22) Filed: Mar. 9, 2017

(65) Prior Publication Data

US 2017/0277026 A1 Sep. 28, 2017

(30) Foreign Application Priority Data

Mar. 23, 2016 (JP) ................................. 2016-058828
Jan. 17, 2017 (JP) ................................. 2017-005553

(51) Int. Cl.
| | | |
|---|---|---|
| G03B 21/16 | (2006.01) | |
| G03B 21/00 | (2006.01) | |
| G02B 7/18 | (2006.01) | |
| G02B 26/08 | (2006.01) | |

(52) U.S. Cl.
CPC ........... *G03B 21/16* (2013.01); *G02B 7/1815* (2013.01); *G02B 26/0833* (2013.01); *G03B 21/008* (2013.01)

(58) Field of Classification Search
CPC ........................ G02B 26/0833; G02B 7/1815; G03B 21/008; G03B 21/16
See application file for complete search history.

(56) References Cited

U.S. PATENT DOCUMENTS

| | | | | |
|---|---|---|---|---|
| 2006/0176453 A1* | 8/2006 | Miyamoto | ............. | G03B 21/16 353/119 |
| 2006/0227514 A1* | 10/2006 | Kang | ................... | H04N 5/7458 361/719 |
| 2008/0024733 A1* | 1/2008 | Gerets | ............... | G02F 1/133553 353/52 |

FOREIGN PATENT DOCUMENTS

| | | | | | |
|---|---|---|---|---|---|
| GB | 2451684 A | * | 2/2009 | ............. | G03B 21/16 |
| JP | 2005-241969 | | 9/2005 | | |
| JP | 2010-032945 | | 2/2010 | | |
| JP | 2010-175583 | | 8/2010 | | |
| JP | 2010-256666 | | 11/2010 | | |

\* cited by examiner

*Primary Examiner* — Sultan Chowdhury
*Assistant Examiner* — Magda Cruz
(74) *Attorney, Agent, or Firm* — McDermott Will & Emery LLP (57) ABSTRACT

A cooling device is adapted to cool a DMD including a reflection surface and a support frame for supporting the outer edge of the reflection surface, and includes first and second contact portions and a water cooling pump. The first and second contact portions each have a contact surface that is brought into contact with a side surface in a direction transverse the reflection surface at the support frame. The water cooling pump is connected to the first and second contact portions so as to cool the first and second contact portions.

13 Claims, 9 Drawing Sheets

Analysis configuration of cooling device

|  |  | (a) Contact with only side surface | (b) Contact with front surface and side surface | (c) Contact with only front surface |
|---|---|---|---|---|
| Contact area between support frame and contact member | (cm$^2$) | 3.7 | 7.9 | 4.3 |
| Front surface of support frame (partially averaged) | (°C) | 87 | 87 | 93 |
| Point P | (°C) | 84 | 82.5 | 85 |

COOLING DEVICE, OPTICAL MODULE PROVIDED WITH THE SAME, AND PROJECTING DEVICE

BACKGROUND

1. Technical Field

The present disclosure relates to a cooling device for cooling heat generated at an optical element, an optical module provided with the same, and a projecting device.

2. Description of the Related Art

In recent years, as a projector (i.e., a projecting device) has had a higher luminance, a laser beam focused on a reflection surface of a reflection type optical element such as a digital mirror device (hereinafter abbreviated as a "DMD") has had a higher output. In this manner, the amount of heat generated at the DMD is increased, and therefore, the heat generation may cause a failure of the DMD.

Moreover, since an optical part such as a prism is disposed on the side of the reflection surface of the DMD inside of the projector, it is difficult to dispose a cooling mechanism or the like in the vicinity of the reflection surface of the DMD.

For example, Unexamined Japanese Patent Publication No. 2010-32945 discloses a heat radiating device for a DMD element, in which a metallic flat plate having high heat conductivity is brought into contact with a plane forming the intermediate portion of the DMD element on the side of the reflection surface of the DMD element so as to absorb heat.

However, the above-described conventional heat radiating device for the DMD element has had the following problem.

That is to say, in the heat radiating device disclosed in Unexamined Japanese Patent Publication No. 2010-32945, the metallic flat plate having high heat conductivity is brought into contact with the plane substantially parallel to the reflection surface of the DMD element on the side of the reflection surface of the DMD element so as to absorb the heat. However, with this configuration, it cannot be said that the heat generated at the DMD element having an increased amount of generated heat can be effectively cooled.

SUMMARY

A problem to be solved by the present disclosure is to provide a cooling device capable of effectively cooling heat generated at an optical element, an optical module provided with the same, and a projecting device.

The cooling device according to the present disclosure is adapted to cool an optical element including a light receiving surface and a support frame for supporting the outer edge of the light receiving surface. The cooling device includes a contact member and a cooling unit. The contact member has a first contact surface that is brought into contact with a side surface in a direction transverse the light receiving surface at the support frame. The cooling unit is connected to the contact member and cools the contact member.

DETAILED DESCRIPTION

Exemplary embodiments will be explained below in detail appropriately referring to the attached drawings. Here, detailed explanation more than necessary may be omitted. For example, detailed explanation of an already well-known matter or duplicated explanation of a substantially identical configuration may be omitted. This is to prevent the following description from becoming redundant more than necessary so as to facilitate understanding by one skilled in the art.

Incidentally, the Applicant provides the attached drawings and the following description in order to help one skilled in the art fully understand the present disclosure, but does not intend to limit the subject matter recited in claims within the attached drawings and the following description.

First Exemplary Embodiment

A description will be given below of projector (i.e., projecting device) 100 having cooling device 20 and optical module 10 provided with the same mounted thereon in an exemplary embodiment of the present disclosure with reference to FIG. 1 to FIG. 4.

(Configuration of Projector 100)

Figure 1:
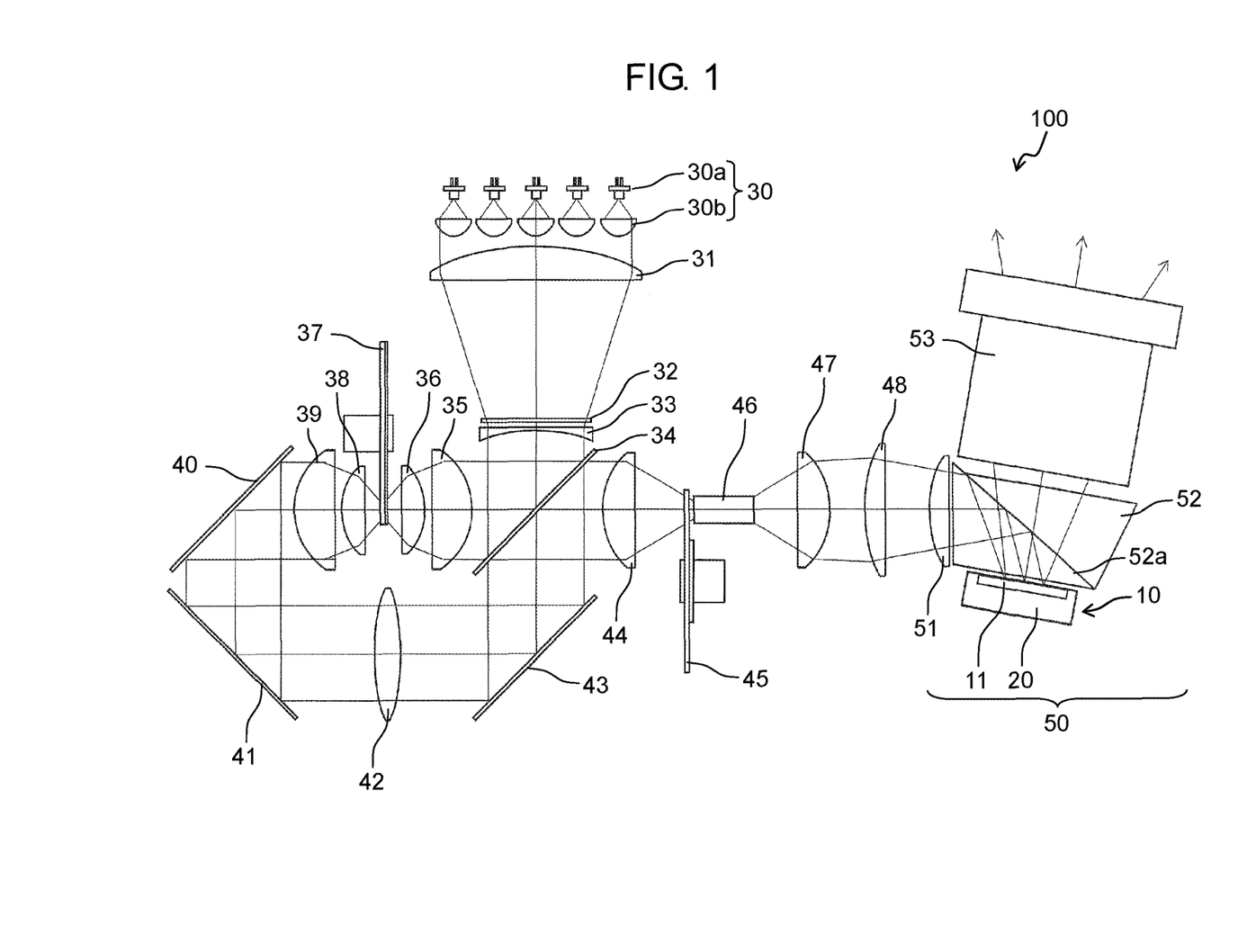
FIG. 1 is a view showing the configuration of a projector having an optical module mounted thereon, the optical module including a cooling device according to an exemplary embodiment of the present disclosure.

FIG. 1 is a view showing the configuration of projector 100 having an optical module mounted thereon, the optical module including a cooling device according to an exemplary embodiment of the present disclosure. In FIG. 1, projector 100 according to the present exemplary embodiment is a video display device having one spatial optical modulator (e.g., DMD 11) mounted thereon for modulating a light beam in response to a video signal, and including a laser beam source, a fluorescent material that is excited with a laser beam so as to emit a fluorescent light beam, and a color filter for removing a wavelength region of a part of the fluorescent light beam.

In the present exemplary embodiment, the laser beam source is exemplified by semiconductor laser 30a (see FIG. 1).

The fluorescent material is provided such that it is excited with a laser beam so as to emit a fluorescent light beam.

The color filter is provided such that it is adapted to remove a wavelength region of a part of the fluorescent light beam.

As shown in FIG. 1, projector 100 is provided with a lighting device including light source unit 30, phosphor wheel 37, and filter wheel 45, video producing unit 50, and projecting lens (i.e., projecting optical system) 53 for projecting a video light beam produced by video producing unit 50 on a screen, not shown.

Light source unit 30 included in the lighting device has a plurality of blue semiconductor lasers 30a and a plurality of lenses 30b disposed in a manner corresponding to semiconductor lasers 30a, respectively.

In the present exemplary embodiment, semiconductor lasers 30a are used because they output blue laser beams (wavelength: about 450 nm) having a higher optical efficiency than those of green and red laser beams out of laser beams of primary colors RGB. Twenty-five semiconductor lasers 30a are arranged in a matrix of 5×5.

Lenses 30b each have the function of focusing light beams emitted from semiconductor lasers 30a at wide angles into parallel optical fluxes.

The light beams emitted from light source unit 30 are superimposed while being focused by lens 31. The light beams focused by lens 31 pass diffusion plate 32 and lens 33, and then, are emitted into dichroic mirror 34.

Diffusion plate 32 has the function of reducing optical interference by semiconductor lasers 30a.

Lens 33 has the function of returning the light beam focused by lens 31 to a parallel optical flux.

Dichroic mirror 34 is a color combining element having a cutoff wavelength of about 490 nm. Consequently, the light beam parallelized by lens 33 is reflected on dichroic mirror 34, and then, is emitted into phosphor wheel 37.

Here, the light beam emitted into phosphor wheel 37 is focused by lenses 35, 36 in order to reduce a focal spot size into phosphor wheel 37 so as to enhance optical utilization efficiency.

Incidentally, in the present exemplary embodiment, the diameter of a light beam emitted into phosphor wheel 37 is set to about 2.0 mm.

Light beams emitted into first, second, and third segments at phosphor wheel 37 are converted into fluorescent yellow and green light beams, and then, are reflected on phosphor wheel 37, as shown in FIG. 1. These fluorescent light beams are parallelized by lenses 36, 35, as shown in FIG. 1, and then, are returned to and pass dichroic mirror 34.

In the meantime, a light beam emitted into a fourth segment at phosphor wheel 37 passes a cutout region at phosphor wheel 37 as it is.

As shown in FIG. 1, mirrors 40, 41, 43 are arranged on an optical path so as to return the light beams passed phosphor wheel 37 to dichroic mirror 34.

Moreover, as shown in FIG. 1, the light beams passed phosphor wheel 37 are focused by lenses 35, 36, and then, are parallelized by lenses 38, 39.

Lens 42 is arranged so as to relay an extended optical path, as shown in FIG. 1.

The light beam that is returned to dichroic mirror 34 along the relayed optical path after passing phosphor wheel 37 is reflected on dichroic mirror 34.

As a consequence, the light beam passed phosphor wheel 37 and the reflected light beam are combined at dichroic mirror 34.

The combined light beam at dichroic mirror 34 is focused by lens 44, as shown in FIG. 1, passes filter wheel 45, and then, is emitted into rod integrator 46.

Filter wheel 45 includes a glass substrate (i.e., a first segment) and a color filter unit (i.e., a second segment).

The glass substrate is a glass substrate that is highly transparent over the entire visible region.

The color filter unit is a color filter substrate that is highly reflective at a wavelength of 600 nm or less and highly transparent in a visible region at a wavelength of 600 nm or more.

In the present exemplary embodiment, the glass substrate corresponding to the first segment is formed into a sectorial shape having the center angle of about 240 degrees, and furthermore, the color filter unit corresponding to the second segment is formed into a sectorial shape having the center angle of about 120 degrees.

Filter wheel 45 including the glass substrate and the color filter unit is fixed at the substrate thereof to a motor, and thus, is rotationally controlled.

Here, phosphor wheel 37 and filter wheel 45 are rotationally controlled in synchronism at the same rotational speed. Specifically, filter wheel 45 is rotationally controlled such that the glass substrate and the color filter unit are rotated once for a period of time corresponding to one frame (e.g., 1/60 sec.).

Moreover, the rotational control is adjusted such that a yellow fluorescent light beam emitted from the fluorescent region at phosphor wheel 37 is emitted into the color filter unit at filter wheel 45. Therefore, the segmental angles of the fluorescent region and the color filter unit are set to become the same as each other.

The color filter unit removes light beams of 600 nm or less. Thus, short wavelength components are removed from the yellow fluorescent light beam emitted from the fluorescent region, to be thus turned to a red light beam that is emitted into rod integrator 46.

In this manner, projector 100 in the present exemplary embodiment can produce the red light beam by removing the short wavelength components of 600 nm or less from the yellow fluorescent light beam at the color filter unit.

The light beam emitted from rod integrator 46 is relayed by lenses 47, 48, to become an output light beam from the lighting device, and thus, is emitted into video producing unit 50.

(Video Producing Unit 50)

Video producing unit 50 is adapted to produce a video upon receipt of a light beam emitted from the lighting device, and includes lens 51, total reflection prism 52, and optical module 10 having DMD 11, as shown in FIG. 1.

Lens 51 has the function of focusing a light beam from an emission surface of rod integrator 46 on DMD 11.

Total reflection prism 52 has surface 52a, on which a light beam is reflected, and has the function of introducing a light beam emitted through lens 51 to DMD 11. In other words, the light beam emitted into total reflection prism 52 through lens 51 is reflected on surface 52a, and thus, is introduced to DMD 11.

DMD 11 has a plurality of movable micro mirrors, and is controlled by a controller, not shown, at proper timings with color light beams emitted into the micro mirrors, respectively, and in response to an input video signal. The light beam modulated by DMD 11 is introduced to projecting lens 53 through total reflection prism 52. Here, the configuration of optical module 10 including DMD 11 will be described later.

Projecting lens 53 is adapted to project a timewise combined video light beam to a screen, not shown.

Projector (i.e., video display device) 100 in the present exemplary embodiment can display a color video on the screen with the above-described configuration.

(Optical Module 10)

Optical module 10 in the present exemplary embodiment is provided with DMD 11 included in the above-described video producing unit 50 and cooling device 20 for effectively cooling heat generated at DMD 11.

Figure 2:
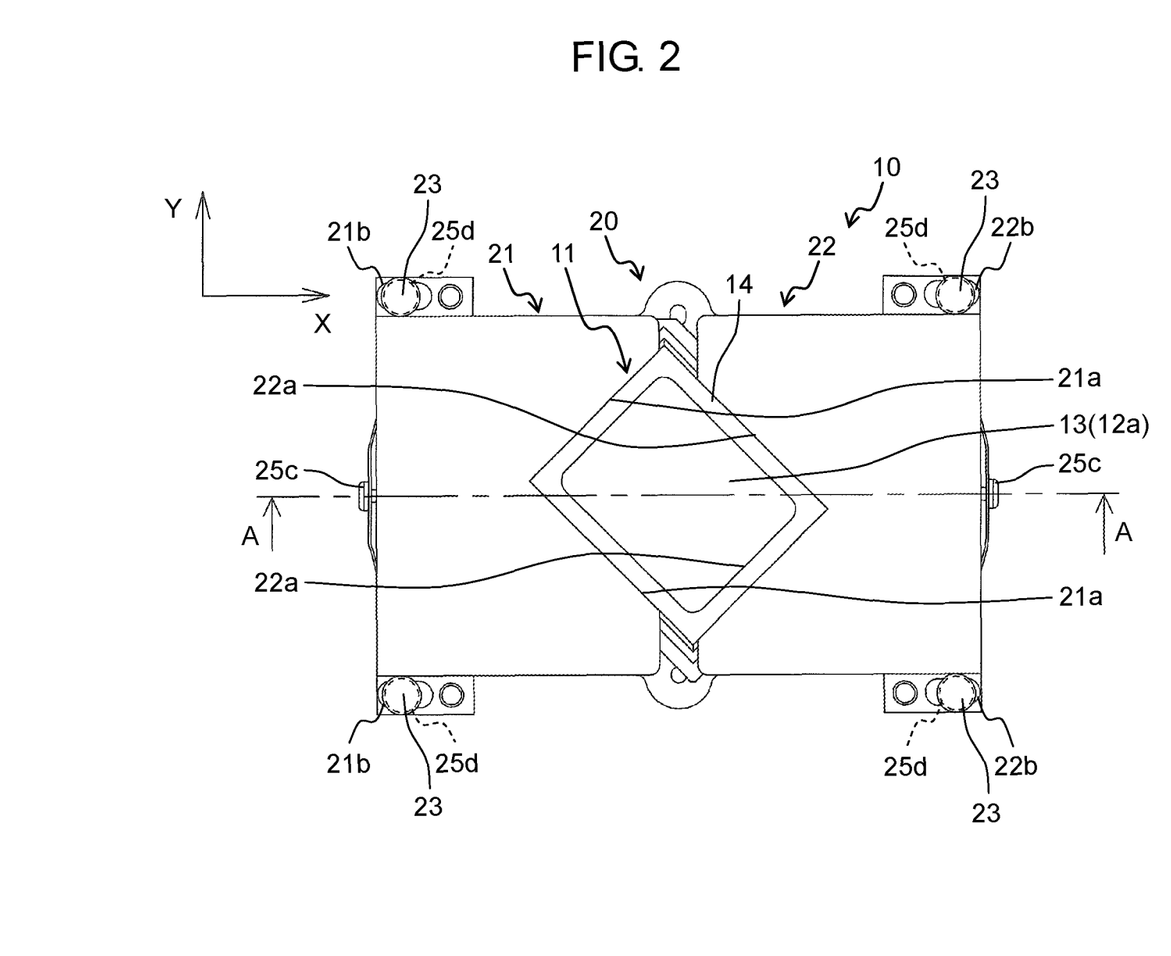
FIG. 2 is a view showing the configuration of the optical module mounted on the projector shown in FIG. 1.
Figure 3:
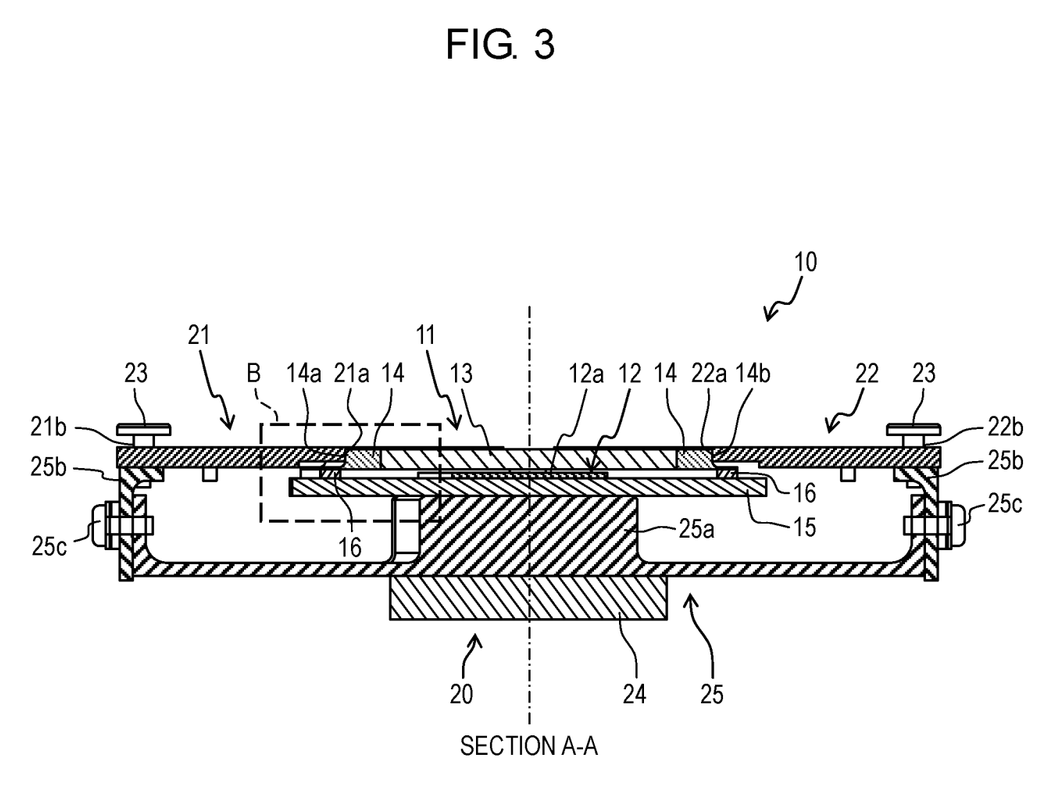
FIG. 3 is a cross-sectional view taken along line A-A of FIG. 2.

FIG. 2 is a view showing the configuration of the optical module mounted on projector 100 shown in FIG. 1. FIG. 3 is a cross-sectional view taken along line A-A of optical module 10 shown in FIG. 2.

As shown in FIG. 2, DMD 11 is formed into a rectangular shape, and its perimeter is surrounded by first contact portion 21 and second contact portion 22 that constitute cooling device 20. Moreover, DMD 11 includes element 12, glass substrate 13, support frame 14, header 15, and seal member 16, as shown in FIG. 2 and FIG. 3.

As shown in FIG. 3, element 12 has reflection surface (i.e., light receiving surface) 12a including a movable micro mirror on a side opposite to the above-described total reflection prism 52.

As shown in FIG. 3, glass substrate 13 is disposed in such a manner as to cover reflection surface 12a of element 12. A light beam emitted from total reflection prism 52 and a light beam emitted into total reflection prism 52 penetrate glass substrate 13.

As shown in FIG. 2 and FIG. 3, support frame 14 is made of a metallic member having high thermal conductivity (such as copper or aluminum), and is formed into a rectangular frame-like shape. Support frame 14 is disposed in such a manner as to surround the outer edge of glass substrate 13 (i.e., reflection surface 12a).

Figure 4:
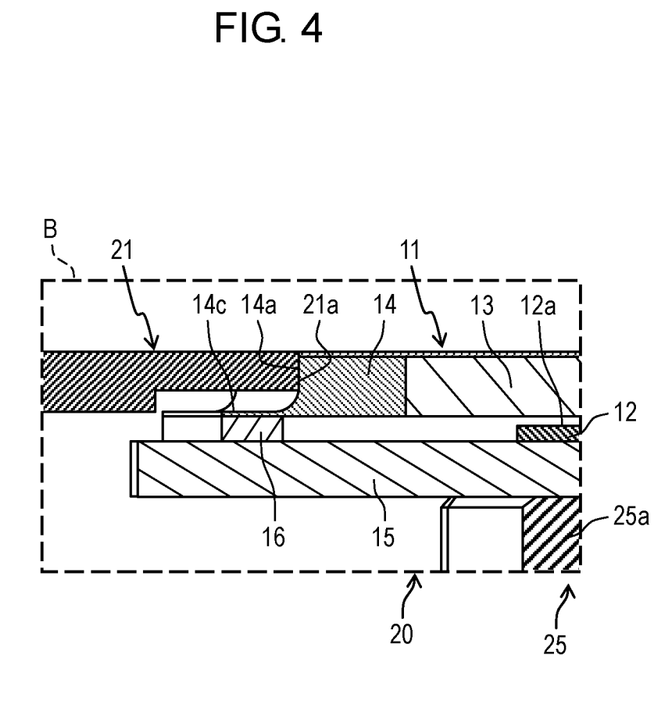
FIG. 4 is an enlarged cross-sectional view showing section B of FIG. 3.

FIG. 4 is an enlarged cross-sectional view showing section B shown in

FIG. 3. As shown in FIG. 4, support frame 14 includes side surfaces 14a, 14b arranged in a direction transverse reflection surface 12a and front surface 14c disposed in a direction substantially parallel to reflection surface 12a.

Incidentally, the contact relationship between support frame 14 and contact members (first and second contact portions 21 and 22) of cooling device 20 will be described later.

As shown in FIG. 3, in header 15, element 12 is placed at the surface on the side of glass substrate 13, thus configuring a base portion of DMD 11. Moreover, header 15 is made of ceramics, and incorporates a wiring, not shown, for making DMD 11 movable. Here, header 15 may be made of alumina other than ceramics.

As shown in FIG. 3, seal member 16 is disposed in such a manner as to fill a clearance defined between header 15 and support frame 14. In this manner, element 12 fixed onto header 15 is disposed in the clearance defined between header 15 and glass substrate 13, and furthermore, is surrounded by seal member 16 in a tightly sealed state.

(Cooling Device 20)

Cooling device 20 in the present exemplary embodiment is a cooling device adopting a water cooling system, so as to suppress heat generation amount of DMD 11 when the laser beam is reflected on reflection surface 12a.

In particular, as high luminance has been required for projector 100 in recent years, the heat generation amount of DMD 11 is increased so as to cause the failure or the like of DMD 11. In view of this, it is necessary to further effectively suppress the heat generation amount of DMD 11.

Cooling device 20 in the present exemplary embodiment includes first contact portion (i.e., contact member) 21, second contact portion (i.e., contact member) 22, screw 23, water cooling pump (i.e., cooler) 24, and stud (i.e., support board) 25, as shown in FIG. 2 and FIG. 3.

First contact portion 21 and second contact portion 22 are made of a copper plate-like member for cooling in direct contact with DMD 11 (i.e., support frame 14), as shown in FIG. 2 and FIG. 3. The copper plate-like member has a split structure that is split into first and second contact portions 21 and 22.

Moreover, first and second contact portions 21 and 22 are thermally connected to water cooling pump 24 via stud 25, so as to cool (thermally exchange) the heat transmitted from DMD 11 at water cooling pump 24.

As shown in FIG. 2, first contact portion 21 is disposed in such a manner as to be brought into contact with two sides of rectangular DMD 11. As shown in FIG. 3 and FIG. 4, first contact portion 21 is brought into contact with side surface 14a of support frame 14 on the side of DMD 11 at a frame-like inner surface (i.e., first contact surface 21a). First contact portion 21 has first contact surface 21a and slot (i.e., position adjusting mechanism) 21b.

As shown in FIG. 4, first contact surface 21a is disposed in the direction transverse the reflection surface 12a of DMD 11 (i.e., element 12), and thus, is brought into contact with side surface 14a of support frame 14.

As shown in FIG. 2, slots 21b are formed at both ends at an end surface opposite to first contact surface 21a at first contact portion 21. Screw 23 is inserted into slot 21b so as to adjust a position in a planar direction of reflection surface 12a of first contact portion 21 with respect to DMD 11.

As shown in FIG. 2, second contact portion 22 is disposed in such a manner as to be brought into contact with two sides opposite to two sides, with which first contact portion 21 of rectangular DMD 11 is brought into contact. As shown in FIG. 3, second contact portion 22 is brought into contact with side surface 14b of support frame 14 on the side of DMD 11 at a frame-like inner surface (i.e., second contact surface 22a). Second contact portion 22 has second contact surface 22a and slot (i.e., position adjusting mechanism) 22b.

As shown in FIG. 3, second contact surface 22a is disposed in the direction transverse the reflection surface 12a of DMD 11 (i.e., element 12), and thus, is brought into contact with side surface 14b of support frame 14.

As shown in FIG. 2, slots 22b are formed near both ends at an end surface opposite to second contact surface 22a at second contact portion 22, respectively. Screw 23 is inserted into slot 22b so as to adjust a position in a planar direction of reflection surface 12a of second contact portion 22 with respect to DMD 11.

Each of screws 23 is inserted into slots 21b, 22b, formed at four corners of first and second contact portions 21 and 22, and then, is screwed into screw hole 25d formed on the side of stud 25. In this manner, first and second contact portions 21 and 22 are fixed to stud 25, so that the positions of first and second contact portions 21 and 22 can be secured with respect to DMD 11 fixed to stud 25.

Water cooling pump 24 is a cooling device of a water cooling type. As shown in FIG. 3, cooling pump 24 is secured to stud 25, so as to cool the heat transmitted via first and second contact portions 21 and 22 and stud 25.

Stud 25 is made of a copper member forming a base for cooling device 20. As shown in FIG. 3, stud 25 has main body 25a, frame member 25b, screw 25c, and screw hole 25d.

As shown in FIG. 3, DMD 11 and water cooling pump 24 are disposed at opposite surfaces of main body 25a, respectively.

As shown in FIG. 2 and FIG. 3, frame members 25b are fixed at both ends in an X direction of main body 25a (see FIG. 2) with screws 25c, respectively.

Screw 25c is a tightening member for fixing frame member 25b to main body 25a, and is screwed into a screw hole formed at the side surface of main body 25a.

As shown in FIG. 2, screw hole 25d is formed at a surface on the side of reflection surface 12a at frame member 25b (i.e., total reflection prism 52 side). Screw hole 25d is formed into a hole that is longer in the X direction in FIG. 2 than in a Y direction perpendicular to the X direction in order to adjust the positions of first and second contact portions 21 and 22 in the planar direction parallel to reflection surface 12a.

In cooling device 20 in the present exemplary embodiment, as described above, first and second contact surfaces 21a and 22a of first and second contact portions 21 and 22 that are made of copper are securely brought into contact with side surfaces 14a, 14b of support frame 14 serving as a part of DMD 11.

In this manner, the heat generated at DMD 11 is transmitted to cooling device 20 from side surfaces 14a, 14b of support frame 14 through first and second contact surfaces 21a, 22a of first and second contact portions 21 and 22, and thus, can be cooled (thermally exchanged) by water cooling pump 24.

Here, the present exemplary embodiment is configured such that only side surfaces 14a, 14b of support frame 14 are brought into contact with first and second contact portions 21 and 22 on the side of cooling device 20.

In this manner, the transmission path of the heat generated at DMD 11 becomes shorter than conventional one, thus reducing thermal resistance. As a consequence, it is possible to more effectively cool the heat generated at DMD 11 than conventional technique, so as to suppress an increase in temperature at DMD 11.

Additionally, in cooling device 20 in the present exemplary embodiment, slots 21b, 22b, into which screws 23 are inserted, and screw hole 25d, into which screw 23 is screwed, configure the position adjusting mechanism for adjusting the positions of first and second contact portions 21 and 22 in the above-described configuration.

Consequently, the positions of first and second contact portions 21 and 22 can be adjusted in the planar direction of reflection surface 12a in a state in which screw 23 is loosened. As a consequence, it is possible to secure first and second contact surfaces 21a, 22a and side surfaces 14a, 14b of support frame 14 in such a manner as to enlarge their mutual contact area as much as possible.

Second Exemplary Embodiment

A description will be given below of cooling device 120 and optical module 110 provided with the same in another exemplary embodiment of the present disclosure with reference to FIG. 5.

Figure 5:
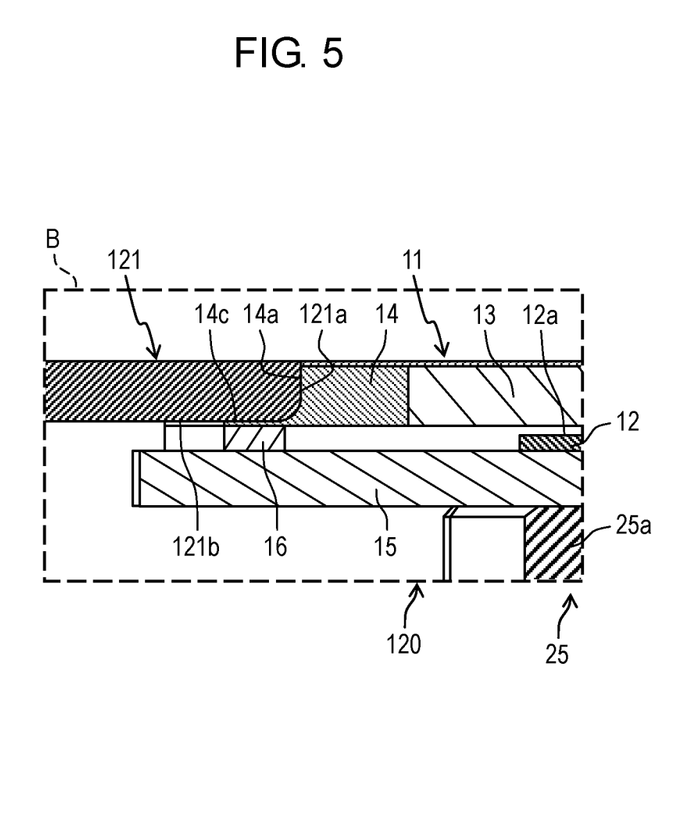
FIG. 5 is an enlarged view showing essential parts of the configuration of the optical module including the cooling device according to another exemplary embodiment of the present disclosure.

FIG. 5 is an enlarged view showing essential parts of the configuration of the optical module including cooling device 120 according to another exemplary embodiment of the present disclosure. As shown in FIG. 5, cooling device 120 in the present exemplary embodiment is identical to cooling device 20 in the above-described first exemplary embodiment in that first contact surface 121a of first contact portion (i.e., contact member) 121 is brought into contact with side surface 14a of support frame 14. However, cooling device 120 in the present exemplary embodiment is different from cooling device 20 in the above-described first exemplary embodiment in that second contact surface 121b of first contact portion 121 is brought into contact with front surface 14c disposed in a direction substantially parallel to reflection surface 12a of DMD (i.e., optical element) 11.

Here, a second contact surface on a side of a second contact portion (i.e., a contact member) is brought into contact with support frame 14 in the same manner, although they are not shown in FIG. 5.

Specifically, in cooling device 120 in the present exemplary embodiment, first contact surface 121a of first contact portion 121 is brought into contact with side surface 14a of support frame 14, and furthermore, second contact surface 12 lb of first contact portion 121 is brought into contact with front surface 14c, thus cooling heat generated at DMD 11.

In this manner, the heat generated at DMD 11 is transmitted from side surface 14a and front surface 14c of support frame 14 toward cooling device 120 through first contact surface 121a of first contact portion 121, to be thus cooled (thermally exchanged) by water cooling pump 24.

Here, the present exemplary embodiment is configured such that side surface 14a and front surface 14c of support frame 14 are brought into contact with first contact portion 121 on the side of cooling device 120.

Therefore, a transmission path for the heat generated at DMD 11 can be secured at not only the shortest side surface 14a but also at the front surface 14c. As a consequence, it is possible to reduce thermal resistance, more effectively cool the heat generated at DMD 11 than conventional technique, and thus, suppress an increase in temperature at DMD 11.

EXAMPLE 1

The present example explains the effects of cooling function by the configuration of cooling devices 20, 120 and optical modules 10, 110 provided with the same that have been explained in the above-described first exemplary embodiment by way of Comparative Example.

Specifically, in the present example, a description will be given below of simulation results for verifying the cooling effects by cooling devices 20, 120 in the above-described first and second exemplary embodiments and cooling device 320 in Comparative Example with reference to FIG. 6 to FIG. 8.

Since the configuration explained in the present example is basically identical to the configuration explained in the above-described first and second exemplary embodiments, a constituent having the same function is designated by the same reference numeral, and therefore, detailed explanation will be omitted.

Figure 6:
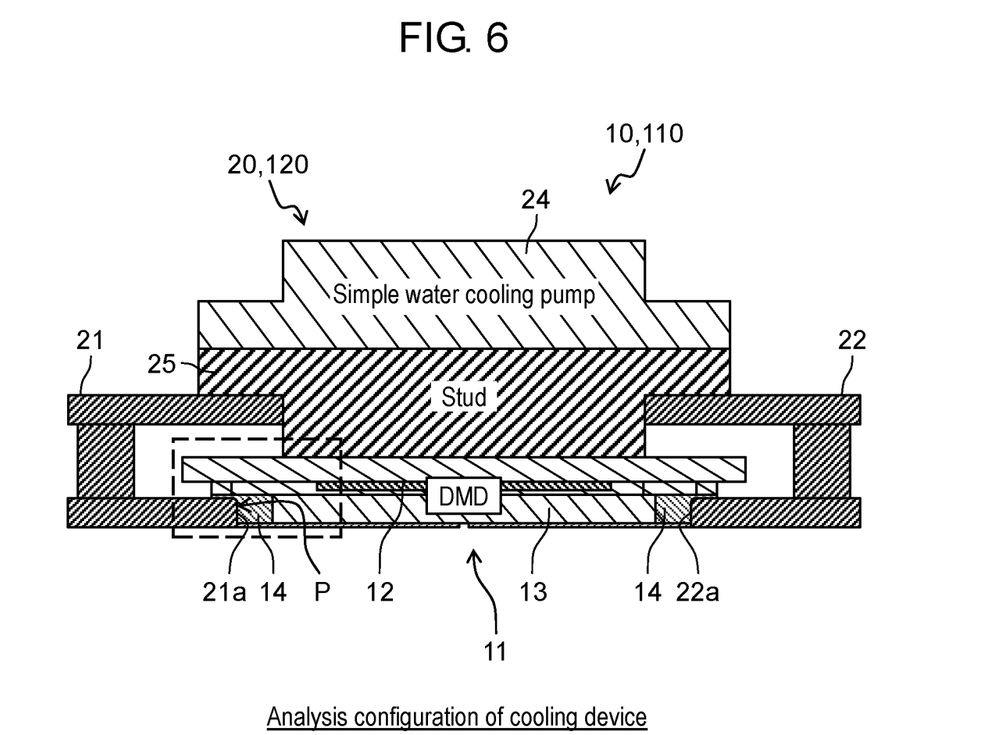
FIG. 6 is a cross-sectional view showing a configuration for verifying a cooling effect by the cooling device according to an example of the present disclosure.

FIG. 6 is a cross-sectional view showing a configuration for verifying the cooling effects of cooling devices 20, 120 according to an example of the present disclosure.

The configurations of cooling devices 20, 120 according to the present example and optical modules 110, 210 provided with the same are basically identical to those of cooling devices 20, 120 and optical modules 10, 110 provided with the same according to the above-described first and second exemplary embodiments, as shown in FIG. 6.

Figure 7A:
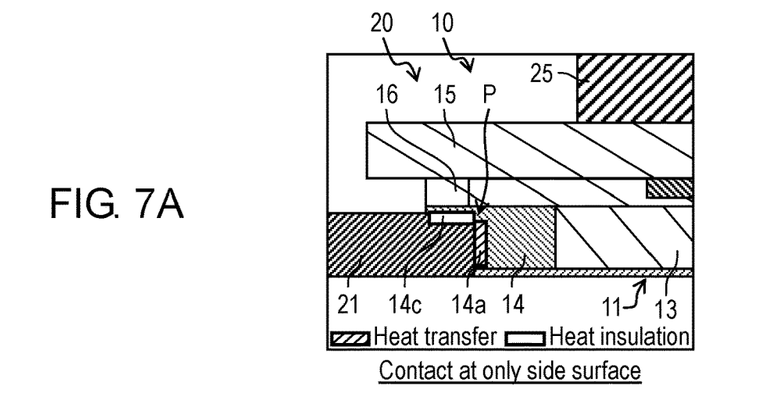
FIG. 7A is a cross-sectional view showing essential parts of the configuration shown in FIG. 6, in which a contact member is brought into contact with only the side surface of a support frame of a DMD.

FIG. 7A is a cross-sectional view showing essential parts of the configuration shown in FIG. 6, in which a contact member is brought into contact with only the side surface of a support frame of a DMD; FIG. 7B is a cross-sectional view showing essential parts of the configuration shown in FIG. 6, in which a contact member is brought into contact with the side surface and front surface of the support frame of the DMD; and FIG. 7C is a cross-sectional view showing essential parts of the configuration shown in FIG. 6, in which a contact member is brought into contact with only the front surface of a support frame of a DMD.

As shown in FIG. 7A, cooling device 20 according to the present example is configured such that cooling device 20 is brought into contact with first and second contact portions 21 and 22 only at side surfaces 14a, 14b of support frame 14, like in cooling deice 20 in the above-described first exemplary embodiment.

Figure 7B:
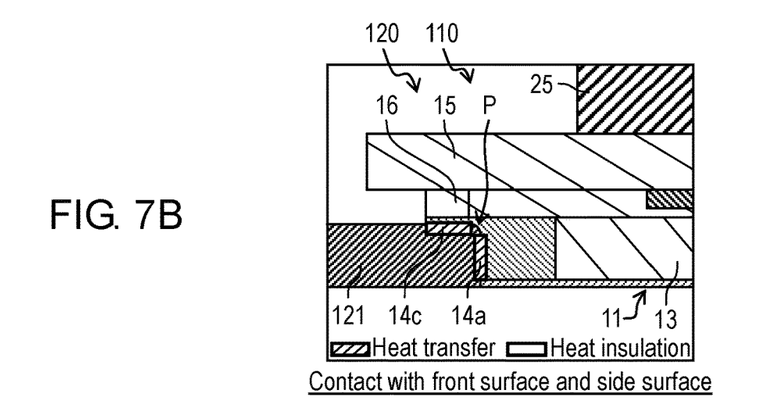
FIG. 7B is a cross-sectional view showing essential parts of the configuration shown in FIG. 6, in which a contact member is brought into contact with the side surface and front surface of the support frame of the DMD.

Moreover, as shown in FIG. 7B, cooling device 120 according to the present example is configured such that first contact surface 121a of first contact portion 121 is brought into contact with side surface 14a of support frame 14, and furthermore, second contact surface 121b of first contact portion 121 is brought into contact with front surface 14c, thus cooling heat generated at DMD 11, like in cooling deice 120 in the above-described second exemplary embodiment.

Moreover, the configurations of cooling device 320 according to Comparative Example and optical module 310 provided with the same are basically identical to those of cooling devices 20 and 120 and optical modules 10 and 110 provided with the same according to the above-described first and second exemplary embodiments.

Figure 7C:
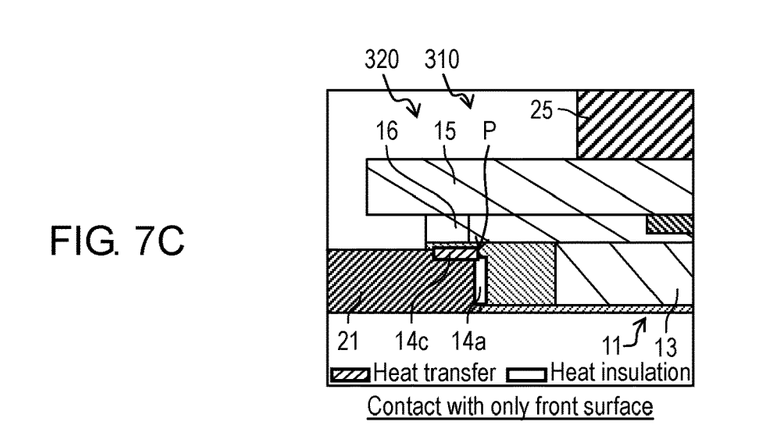
FIG. 7C is a cross-sectional view showing essential parts of a configuration shown in FIG. 6 in a comparative example in which a contact member is brought into contact with only the front surface of a support frame of a DMD.

However, as shown in FIG. 7C, cooling device 320 according to Comparative Example is different from those in the above-described first and second exemplary embodiments in that first contact portion 21 of cooling device 320 and support frame 14 of DMD 11 are brought out of contact with side surface 14a, but are brought into contact with only front surface 14c.

Figure 8:
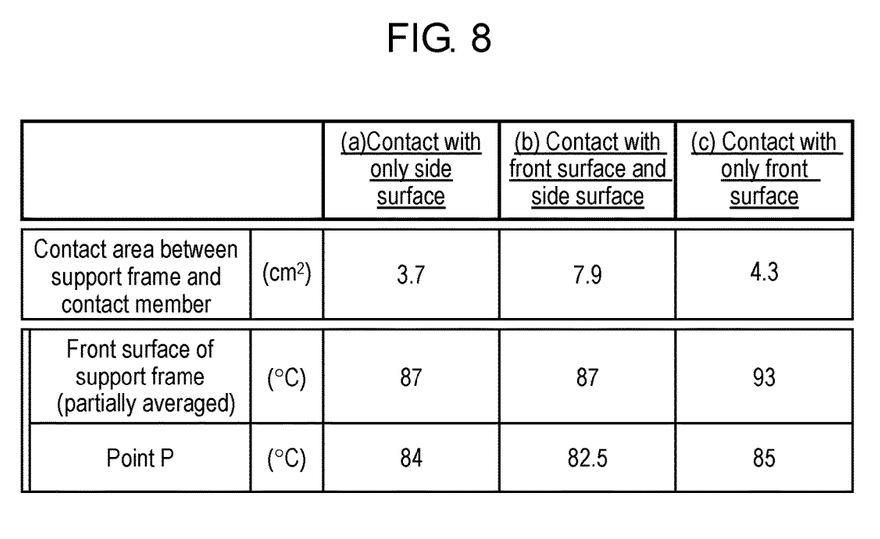
FIG. 8 is a table illustrating simulation results of the verification of cooling effects corresponding to FIGS. 7A to 7C.

The result of a simulation for verifying the effect of cooling DMD 11 by the above-described cooling devices 20, 120, 320 is shown in FIG. 8.

FIG. 8 is a table illustrating simulation results of the verification of the cooling effects corresponding to FIGS. 7A to 7C. In FIG. 8, regarding three patterns, that is, (a) contact with only a side surface corresponding to cooling device 20 in the first exemplary embodiment; (b) contact with a front surface and a side surface corresponding to cooling device 120 in the second exemplary embodiment; and (c) contact with only a front surface corresponding to cooling device 320, specifically, the contact area between each of the contact members and the support frame, an average temperature at the front surface of the support frame, and a temperature at point P (see FIG. 6) were verified in environment in which the inside of a casing has a temperature of 55° C.

As a result, as shown in FIG. 8, in the case of (a) the contact with only the side surface corresponding to cooling device 20, the contact area was 3.7 cm$^2$, the average temperature at the front surface of the support frame was 87° C., and the average temperature at point P was 84° C.

In addition, in the case of (b) the contact with the front surface and the side surface corresponding to cooling device 120, the contact area was 7.9 cm$^2$, the average temperature at the front surface of the support frame was 87° C., and the average temperature at point P was 82.5° C.

Upon comparison of (a) and (b), although the contact area between support frame 14 and the contact member (i.e., first contact portions 21, 121) in the case (a) was as small as less than 50% of that in the case (b), the average temperature of support frame 14 was equally 87° C., and furthermore, a difference in average temperature at point P was slightly 1.5° C.

In contrast, in the case of (c) the contact with only the front surface corresponding to cooling device 320 according to Comparative Example, the contact area was 4.3 cm$^2$, the average temperature at the front surface of the support frame was 93° C., and the average temperature at point P was 85° C.

Upon comparison of (a) and (c) and of (b) and (c), the contact area between support frame 14 and the contact member (i.e., first contact portions 21, 121) in the case (c) was slightly larger than that in the case (a) and was as small as about 54% of that in the case (b). Moreover, the average temperature of support frame 14 in the case (c) was 93° C. that was higher by 6° C. than 87° C. in the cases (a) and (b). Additionally, the average temperature at point P was highest, that is, 85° C.

From the above-described results, it was found that the preferable cooling effect for DMD 11 could be achieved by bringing first contact portions 21, 121 into contact with side surface 14a of support frame 14 on at least the side of DMD 11.

Also in the case where not only side surface 14a but also front surface 14c is brought into contact with first contact portions 21, 121, it was found that there was no large difference from the configuration of the contact with only side surface 14a from the viewpoint of the cooling effect.

Thus, the configuration for effectively cooling the heat generated at DMD 11 should adopt the configuration in which first contact portions 21, 121 are brought into contact with at least side surface 14a of support frame 14 on the side of DMD 11.

[Other Exemplary Embodiments]

Although the exemplary embodiments of the present disclosure have been explained, the present disclosure is not limited to the above-described exemplary embodiments. Various modifications are achieved within the scope without departing from the subject matter of the disclosure.

(A)

In the above-described exemplary embodiments, the description has been given of that first and second contact surfaces 21a, 22a of first and second contact portions 21 and 22 are brought into direct contact with side surfaces 14a and 14a of support frame 14. However, the present disclosure is not limited to the above-described exemplary embodiments.

Figure 9:
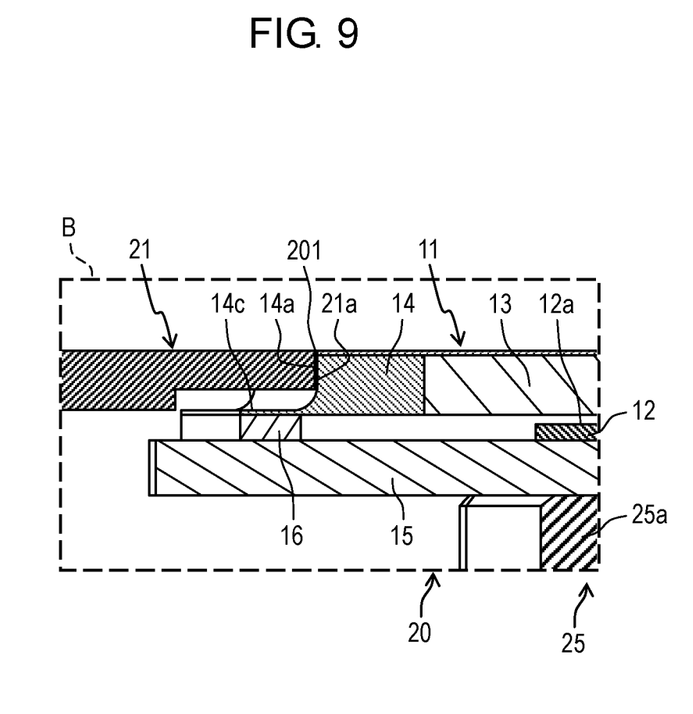
FIG. 9 is an enlarged view showing essential parts of a configuration of an optical module including a cooling device in another exemplary embodiment of the present disclosure.

FIG. 9 is an enlarged view showing essential parts of a configuration of an optical module including a cooling device in a further exemplary embodiment of the present disclosure. As shown in FIG. 9, heat transferring member 201 such as heat transferring paste or a heat transferring sheet may be inserted between contact surface 21a of first contact portion 21 and side surface 14a of support frame 14 so that contact surface 21a and side surface 14a are thermally brought into indirect contact with each other.

In this case, it is preferable that an elastic member should be used as heat transferring member 201 to be inserted between contact surface 21a of first contact portion 21 and side surface 14a of support frame 14.

In this manner, even in the case where the dimensional precision of an outer edge of an optical element such as a DMD is low, the contact member and the support frame can be securely brought into contact due to the elasticity of the heat transferring member.

(B)

In the above-described exemplary embodiments, the description has been given of that the contact member having a split structure including first contact portion 21 and second contact portion 22 cools the heat generated at DMD 11. However, the present disclosure is not limited to the above-described exemplary embodiments.

For example, a contact member formed as a single member may be used.

Moreover, the split structure of the contact member is not limited to the two-split structure in the above-described exemplary embodiments. The member may be split into three or more portions.

In particular, a split structure may include the same number of contact portions as that of side surfaces of an optical element.

(C)

In the above-described exemplary embodiments, the description has been given of that DMD 11 has been used as an optical element to be cooled by cooling device 20. However, the present disclosure is not limited to the above-described exemplary embodiments.

For example, an optical element to be cooled may be a transparent optical element or other optical elements having a light receiving surface such as a pickup element.

(D)

In the above-described exemplary embodiments, the description has been given of that cooling device 20 of the water cooling type has been used to cool the heat generated at DMD 11. However, the present disclosure is not limited to the above-described exemplary embodiments.

For example, in the case where an output of a laser beam received by an optical element is low (e.g., 30,000 lumen or less), the amount of generated heat is decreased. Therefore, the cooling device of the water cooling type may be replaced with a cooling device of an air cooling type.

(E)

In the above-described exemplary embodiments, the description has been given of that first and second contact portions 21 and 22 made of copper have been used as the contact members included in cooling device 20. However, the present disclosure is not limited to the above-described exemplary embodiments.

For example, the material of the contact member may be metals other than copper as long as the material has high thermal conductivity.

(F)

In the above-described exemplary embodiments, the description has been given of that projector 100 has one DMD 11 mounted thereon. However, the present disclosure is not limited to the above-described exemplary embodiments.

For example, the cooling device and the optical module according to the present disclosure may be applied to a projector having three DMDs corresponding to three primary colors RGB mounted thereon.

(G)

In the above-described exemplary embodiments, the description has been given of that the slot and the screw have been used as the position adjusting mechanism. However, the present disclosure is not limited to the above-described exemplary embodiments.

For example, first contact portion 21 and second contact portion 22 may be movably supported by using a bearing. Alternatively, a slider capable of moving first contact portion 21 and second contact portion 22 may be used as a position adjusting mechanism.

The cooling device according to the present disclosure can produce the effect of effectively cooling the heat generated at the optical element, and thus, is widely used as a cooling device for an optical element having a light receiving surface at which a light beam is received.

What is claimed is:

1. A cooling device for cooling an optical element including a light receiving surface and a support frame for supporting an outer edge of the light receiving surface, the cooling device comprising:
   a contact member including a first contact portion and a second contact portion, and having a first contact surface that is brought into contact with a side surface in a direction transverse the light receiving surface at the support frame; and
   a cooling unit that is connected to the contact member and cools the contact member,
   wherein the first contact portion is brought into contact with a first side surface of the side surface, and
   the second contact portion is brought into contact with a second side surface of the side surface that is different from the first side surface.

2. The cooling device according to claim 1, further comprising a position adjusting mechanism that adjusts positions of the first contact portion and the second contact portion relative to the optical element in a direction substantially parallel to the light receiving surface.

3. The cooling device according to claim 1, wherein the support frame is formed into a rectangular shape,
   the first contact portion is brought into contact with two adjacent side surfaces forming the support frame, and
   the second contact portion is connected to two side surfaces different from the side surfaces, with which the first contact portion is brought into contact.

4. The cooling device according to claim 1, wherein the contact member is brought out of contact with a front surface substantially parallel to the light receiving surface at the support frame.

5. The cooling device according to claim 4, further comprising a heat insulating member interposed between the contact member and the front surface at the support frame.

6. The cooling device according to claim 1, wherein the contact member includes a second contact surface that is brought into contact with a front surface substantially parallel to the light receiving surface at the support frame.

7. The cooling device according to claim 1, further comprising a heat transferring member interposed between the first contact surface of the contact member and the side surface of the support frame.

8. The cooling device according to claim 1, wherein the cooling unit is fixed to a support board for supporting the optical element on a back side opposite to the light receiving surface.

9. The cooling device according to claim 1, wherein the optical element is a reflection type optical element.

10. An optical module comprising:
    the cooling device according to claim 1; and
    the optical element.

11. A projecting device comprising:
    the optical module according to claim 10;
    an optical member that guides a light beam to the optical element; and
    a light source unit that emits a light beam to the optical member.

12. The cooling device according to claim 1, wherein the first contact portion and the second contact portion are physically separated from each other on opposing sides of the optical element and movable relative to each other in a direction substantially parallel to the light receiving surface.

13. The cooling device according to claim 1, wherein the side surface is an outer side surface.

* * * * *